United States Patent
Kim et al.

(10) Patent No.: US 12,202,376 B2
(45) Date of Patent: Jan. 21, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Jin Kim, Suwon-si (KR); HanYoung Park, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/391,022

(22) Filed: Dec. 20, 2023

(65) Prior Publication Data

US 2024/0116395 A1  Apr. 11, 2024

Related U.S. Application Data

(63) Continuation of application No. 16/991,819, filed on Aug. 12, 2020, now Pat. No. 11,938,837.

(30) Foreign Application Priority Data

Dec. 16, 2019 (KR) .......................... 10-2019-0167565

(51) Int. Cl.
*B60L 53/22* (2019.01)
*B60L 8/00* (2006.01)
(Continued)

(52) U.S. Cl.
CPC ............... *B60L 58/12* (2019.02); *B60L 8/003* (2013.01); *B60L 53/22* (2019.02); *B60L 58/18* (2019.02);
(Continued)

(58) Field of Classification Search
CPC ................. B60L 58/12; B60L 2260/22; B60L 2240/665; B60L 58/18; B60L 53/22;
(Continued)

(56) References Cited

U.S. PATENT DOCUMENTS 4,245,286 A * 1/1981 Paulkovich ........... H02M 3/158
363/101
2012/0146572 A1* 6/2012 Ward ...................... B60L 8/003
320/101

(Continued)

FOREIGN PATENT DOCUMENTS

JP  2019083113 A  5/2019
JP  2019176687 A  10/2019

*Primary Examiner* — Elim Ortiz
(74) *Attorney, Agent, or Firm* — Lempia Summerfield Katz LLC

(57) ABSTRACT

A method of controlling a vehicle where the vehicle includes a first battery, a second battery, a solar cell, a power converter, a power divider, and a power supply. The method includes producing power by the solar cell and converting a voltage of the produced power by the power converter. The method also includes transferring, by the power divider, the power produced by the solar cell to at least one of the first battery or the second battery based on a state of charge (SoC) of the first battery and a SoC of the second battery. The method also includes stopping the power supply from supplying power to the power converter when a time for which the power is supplied to the power converter is longer than or equal to a predetermined reference time.

7 Claims, 6 Drawing Sheets

(51) Int. Cl.
*B60L 58/12* (2019.01)
*B60L 58/18* (2019.01)

(52) U.S. Cl.
CPC ..... *B60L 2240/665* (2013.01); *B60L 2260/22* (2013.01)

(58) Field of Classification Search
CPC ...... B60L 8/003; Y02T 10/70; Y02T 10/7072; Y02T 10/72; Y02T 90/14; Y02T 90/16; B60R 16/033; B60R 16/0238; H02J 7/0048; H02J 7/35; H02S 40/38; Y02E 70/30; Y02E 10/50
See application file for complete search history.

(56) References Cited

U.S. PATENT DOCUMENTS

| | | | | |
|---|---|---|---|---|
| 2018/0026474 A1* | 1/2018 | Takahashi | ............. | H01L 31/042 320/101 |
| 2019/0322193 A1* | 10/2019 | Duan | ...................... | B60L 58/20 |
| 2020/0339103 A1* | 10/2020 | Takahashi | ................. | B60L 3/04 |

* cited by examiner

FIG. 2

| ITEM | | VALUE |
|---|---|---|
| VEHICLE STATE | | TRAVELLING /STOPPED/ PARKED |
| FIRST BATTERY INFORMATION | POWER GENERATION TARGET SOC | 65 ~ 95% |
| | STATE OF MOUNTING | O/X |
| | CHARGE-ABILITY | O/X |
| | CAPACITY(TYPE) | 105 ~ 7AH |
| | STATE OF CHARGE(SOC) | 0 ~ 100% |
| SECOND BATTERY INFORMATION | STATE OF MOUNTING | O/X |
| | CHARGE-ABILITY | O/X |
| | CAPACITY(TYPE) | 105 ~ 7AH |
| | STATE OF CHARGE(SOC) | 0 ~ 100% |
| SOLAR CELL INFORMATION | POWER SUPPLY LIMITATION TIME | 2min |
| | POWER SUPPLY MAINTENANCE TIME | 15s |
| | HOURLY POWER GENERATION AMOUNT | 0 ~ 300W |

VEHICLE AND METHOD OF CONTROLLING THE SAME

CROSS-REFERENCE TO RELATED APPLICATIONS

The present application is a continuation of U.S. application Ser. No. 16/991,819 filed Aug. 12, 2020, which claims priority under 35 U.S.C. § 119 to Korean Patent Application No. 10-2019-0167565 filed Dec. 16, 2019. The entire contents of these prior filed applications are incorporated herein for all purposes by this reference.

BACKGROUND

1. Field

The disclosure relates to a vehicle and a method of controlling the same, and more specifically, to a vehicle including a solar cell and a method of controlling the same.

2. Description of the Related Art

In general, a vehicle refers to a movement device or transportation device that is designed to travel on a road or railway using fossil fuel, electric power, and the like as a motive power source. For example, a vehicle may travel using motive power generated by an engine.

The vehicle may include various electrical devices configured to protect the driver and provide convenience and fun to the driver. The vehicle may also include a battery to supply electric power to the electrical devices. The vehicle may include a generator to supply electric power to the electrical devices and charge the battery.

The generator converts (rotational) kinetic energy of an engine into electrical energy. When the generator operates frequently, the fuel efficiency of the vehicle may decrease.

Recently, in order to improve fuel efficiency, vehicles have been developed that charge batteries using energy harvesting technology, including solar power generation, thermoelectric power generation, and vibration power generation. For example, a solar cell may be installed on a roof panel of a vehicle. The solar cell may generate electric power while travelling or being parked and charge the battery.

However, as for the solar power generation, when the vehicle frequently passes through a shaded area, such as an underpass or between buildings, the power generation efficiency of the solar cell is reduced, thereby lowering the fuel efficiency improvement of the vehicle.

In addition, when the battery of the vehicle is fully charged, the power conversion efficiency for converting the voltage of the electric power produced by the solar cell is reduced, which also lowers the fuel efficiency improvement of the vehicle.

SUMMARY

Therefore, it is an object of the disclosure to provide a vehicle capable of improving the energy harvesting efficiency by a solar cell.

Additional aspects of the disclosure are set forth in part in the description which follows and, in part, should be understood from the description or may be learned by practice of the disclosure.

It is an aspect of the disclosure to provide a vehicle including: a first battery; a second battery; a solar cell; a power divider configured to transfer power produced by the solar cell to the first battery or transfer power produced by the solar cell to the second battery; and a controller configured to control the power divider to transfer the power produced by the solar cell to at least one of the first battery and the second battery based on a state of charge (SoC) of the first battery and a SoC of the second battery.

The vehicle may further include a power converter configured to convert a voltage of the power produced by the solar cell.

The controller may supply power to the power converter when an amount of the power produced by the solar cell is greater than or equal to a reference value.

The controller may supply power to the power converter when the vehicle passes through a shaded area.

The controller may stop supplying the power to the power converter when a time for which the power is supplied to the power converter is longer than or equal to a predetermined reference time.

The controller may control the power produced by the solar cell to be transferred to the first battery when the vehicle is travelling.

The controller may control the power produced by the solar cell to be transferred to the first battery when the vehicle is parked and the first battery has a SoC less than a target SoC.

The controller may control the power produced by the solar cell to be transferred to the second battery when the vehicle is parked, the first battery has a SoC greater than or equal to a target SoC, and the second battery is chargeable.

The controller may control the power produced by the solar cell to be transferred to the first battery when the vehicle is parked, the first battery has a SoC greater than or equal to a target SoC, and the second battery is fully charged.

The controller may control the power divider to interrupt connection between the solar cell and the first and second batteries when the vehicle is parked, the first battery is fully charged, and the second battery is fully charged.

It is another aspect of the disclosure to provide a method of controlling a vehicle including a first battery, a second battery, a solar cell, and a power converter. The method includes: producing, by the solar cell, power; converting, by the power converter, a voltage of the produced power; and transferring the power produced by the solar cell to at least one of the first battery and the second battery based on a SoC of the first battery and a SoC of the second battery.

The method may further include supplying power to the power converter when an amount of the power produced by the solar cell is greater than or equal to a reference value.

The method may further include supplying power to the power converter when the vehicle passes through a shaded area.

The method may further include stopping supplying the power to the power converter when a time for which the power is supplied to the power converter is longer than or equal to a predetermined reference time.

The method may further include transferring the power produced by the solar cell to the first battery when the vehicle is travelling.

The method may further include transferring the power produced by the solar cell to the first battery when the vehicle is parked and the first battery has a SoC less than a target SoC.

The method may further include transferring the power produced by the solar cell to the second battery when the vehicle is parked, the first battery has a SoC greater than or equal to a target SoC, and the second battery is chargeable.

The method may further include transferring the power produced by the solar cell to the first battery when the vehicle is parked, the first battery has a SoC greater than or equal to a target SoC, and the second battery is fully charged.

The method may further include interrupting connection between the solar cell and the first and second batteries when the vehicle is parked, the first battery is fully charged, and the second battery is fully charged.

It is another aspect of the disclosure to provide a vehicle including: a first battery; a second battery; a solar cell; a power converter configured to convert a voltage of power produced by the solar cell; a power divider configured to transfer the power produced by the solar cell to the first battery or transfer the power produced by the solar cell to the second battery; and a controller configured to supply power to the power converter when an amount of the power produced by the solar cell is greater than or equal to a reference value.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 2 illustrates data for power management of a vehicle according to an embodiment;

DETAILED DESCRIPTION

Figure 1:
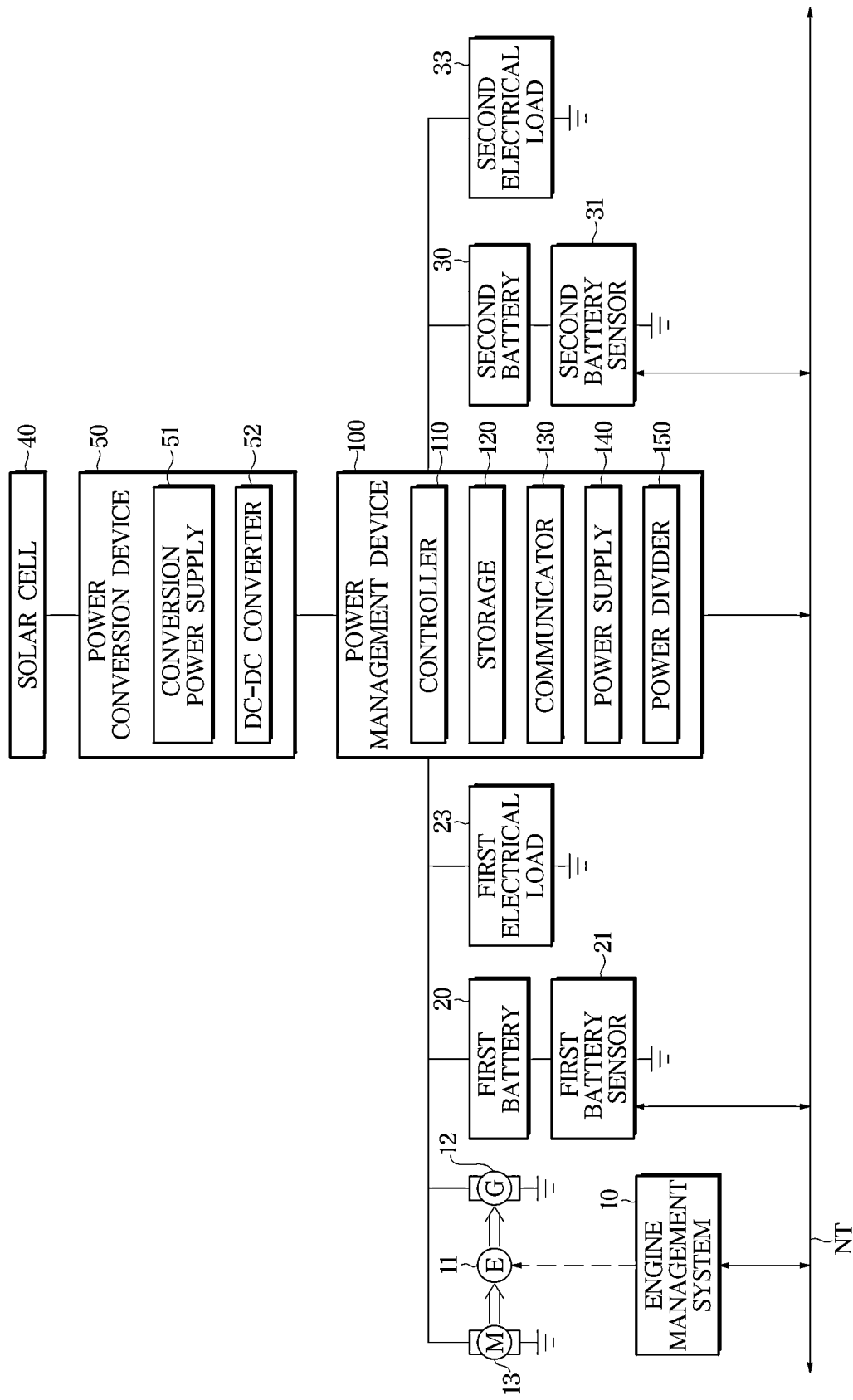
FIG. 1 illustrates power management of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein are suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments are now described more fully hereinafter with reference to the accompanying drawings. The embodiments may, however, be embodied in many different forms and should not be construed as being limited to the embodiments set forth herein. These embodiments are provided so that this disclosure is thorough and complete and fully conveys the embodiments to those of ordinary skill in the art. Like numerals denote like elements throughout.

It should be understood that, although the terms first, second, and the like may be used herein to describe various elements, these elements should not be limited by these terms. These terms are only used to distinguish one element from another. As used herein, the term "and/or," includes any and all combinations of one or more of the associated listed items.

It should be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference is now made in detail to the embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the principles and embodiments of the disclosure are described with reference to the accompanying drawings.

FIG. 1 illustrates power management of a vehicle according to an embodiment.

The vehicle 1 may include a body that forms the external appearance thereof and accommodates a driver and/or luggage, a chassis that includes components of the vehicle 1 except for the body, and electrical devices that protect the driver and provide convenience to the driver.

Referring to FIG. 1, the vehicle 1 includes an engine management system (EMS) 10, a starting motor 13, an engine 11, a generator 12, a solar cell 40, a power conversion device 50, a first battery 20, a first battery sensor 21, a first electrical load 23, a second battery 30, a second battery sensor 31, a second electrical load 33, and a power management device 100. Such electrical devices may communicate with each other through a vehicle communication network (NT). For example, the electrical devices may transmit and receive data through Ethernet, media oriented systems transport (MOST), Flexray, Controller Area Network (CAN), local Interconnect Network (LIN), and the like.

The engine 11 may generate motive power using explosive combustion of fuel or may generate motive power using electricity. The motive power of the engine 11 may be transmitted to wheels. In this case, a portion of rotary power generated by the engine 11 may be provided to the generator 12. The generator 12 may produce electric power (hereinafter, referred to as 'power') from the motive power of the engine 11. A portion of the power produced by the generator 12 is supplied to the electrical devices of the vehicle 1. Another portion of the power may be stored in the first battery 20 of the vehicle 1.

The generator 12 may be connected to the power management device 100 directly or through a vehicle communication network NT. The generator 12 may produce electric energy, i.e., power, in response to a power generation control signal of the power management device 100.

The starting motor 13 may provide motive power to the engine 11 to start the engine 11 in a stationary state. The starting motor 13 may receive power from the battery 20. Since the starting motor 13 consumes a lot of power to start the engine 11, the first battery 20 maintains a state of charge (SoC) equal to or higher than a certain level of SoC (for example, about 30% or more) for operating the starting motor 13.

The engine management system 10 may control the engine 11 in response to a driver's acceleration command through an accelerator pedal and manage the engine 11. For example, the engine management system 10 may perform engine torque control, fuel economy control, and/or engine failure diagnosis. The engine management system 10 may control the generator 12 that produces power from rotation of the engine 11.

The solar cell 40 converts light energy into electrical energy. The solar cell 40 generally includes a PN junction semiconductor in which a P-type semiconductor and an N-type semiconductor are bonded to each other. In a depletion layer of the PN junction, an electron-hole pair is generated by light energy. Electromotive force for generating electric current is generated by the electron-hole pair. In other words, the solar cell 40 may generate power (voltage and current) from light.

The power conversion device 50 may convert the voltage of the power generated by the solar cell 40.

The output power of the solar cell 40 may greatly vary depending on the amount of sunlight. When the amount of sunlight is large, the output power of the solar cell 40 may increase. When the amount of sunlight is small, the output power of the solar cell 40 may decrease. In this case, the variation of the output power of the solar cell 40 includes the variation of the output voltage as well as the variation of the output current. In addition, the voltage at which the solar cell 40 outputs the maximum power may be varied according to temperature. As such, the output voltage output from the solar cell 40 may vary depending on external weather.

The power conversion device 50 may convert the output voltage of the solar cell 40 that changes depending on external weather into a predetermined target voltage (e.g., 14.5V).

The power conversion device 50 includes a DC-DC converter 52 for changing the voltage and a conversion power supply 51 for supplying power to the DC-DC converter 52.

The DC-DC converter 52 may convert the output voltage of the solar cell 40 to a predetermined target voltage (e.g., 14.5V). For example, the DC-DC converter 52 may output a predetermined target voltage (e.g., 14.5V) by dropping or increasing the output voltage of the solar cell 40.

The conversion power supply 51 supplies power to the DC-DC converter 52. The DC-DC converter 52 may drop or increase the input voltage by, for example, a switching operation of a switch. Therefore, the conversion power supply 51 may supply power for the switching operation of the DC-DC converter 52.

The conversion power supply 51 may supply the power supplied from the solar cell 40, i.e., the power in which the voltage is converted by the DC-DC converter 52, to the DC-DC converter 52. The conversion power supply 51 may also supply the power supplied from the power management device 100 to the DC-DC converter 52. For example, when a sufficient amount of power is supplied from the solar cell 40, the conversion power supply 51 may supply the power supplied from the solar cell 40 to the DC-DC converter 52. In addition, when the amount of sunlight is low and thus power supplied from the solar cell 40 is insufficient, the conversion power supply 51 may supply power supplied from the power management device 100 to the DC-DC converter 52.

The first battery 20 may store electrical energy generated from the motive power of the engine 11 and provide the electrical energy to the first electrical load 23. During travelling of the vehicle 1, the generator 12 may convert rotational energy of the engine into electrical energy. The first battery 20 may receive the electrical energy from the generator 12 and store the electrical energy. When the power consumed by the first electrical load 23 during travelling of the vehicle 1 is greater than the power produced by the generator 12, the first battery 20 may supply power to the first electrical load 23. Also, the first battery 20 may supply power to the first electrical load 23 in a parked state of the vehicle in which the engine 11 is stopped.

In addition, the first battery 20 may receive electric energy produced by the solar cell 40 through the power management device 100. The first battery 20 may be charged by power generated by the solar cell 40.

The first battery sensor 21 may detect the output (output voltage, output current, and the like) of the first battery 20. The first battery sensor 21 may generate battery data based on the output voltage of the first battery 20, the output current of the first battery 20, and the temperature of the first battery 20.

For example, the first battery sensor 21 may determine a SoC of the first battery 20 based on the output voltage of the first battery 20, the output current of the first battery 20, and the temperature of the first battery 20. The SoC of the first battery 20 may indicate a level at which electric energy is stored in the first battery 20. The SoC generally has a value of 0% to 100% and indicates the degree to which the first battery 20 is charged between a full discharge state (0%) and a full charge state (100%). The SoC of the first battery 20 may be calculated based on an open circuit voltage (OCV) of the first battery 20 and input/output current of the first battery 20.

In addition, the first battery sensor 21 determines the internal resistance of the first battery 20 based on the output voltage of the first battery 20 and the output current of the first battery 20 when the engine 11 starts. Also, the first battery sensor 21 may determine a State of Health (SoH) of the first battery 20 based on the internal resistance of the first battery 20 and the charge/discharge time of the first battery 20. The SoH generally has a value of 0% to 100% and indicates the degree of aging of the first battery 20 between a fully aging state (0%) and a fully up-to-date state (100%).

As such, the first battery sensor 21 transmits first battery data including the SoC of the first battery 20, the SoH of the first battery 20, and the like to the power management device 100.

The first electrical load 23 may be a device that consumes power supplied from the first battery 20 or the generator 12 to allow travelling/braking/steering of the vehicle 1 or to provide convenience to the driver of the vehicle 1. The first electrical load 23 may include, for example, an engine management system (EMS), a transmission controller (TCU), an electronic brake control module (EBCM), a Motor-Driven Power Steering (MDPS), a body control module (BCM), an audio device, a heating/ventilation/air conditioning (HVAC) device, a navigation device, a power seat, a seat heater, a headlight, and the like.

The second battery 30 may store electrical energy provided from the first battery 20 and/or the generator 12 through the power management device 100 and provide the electrical energy to the second electrical load 33. The power management device 100 may transfer electrical energy of the first battery 20 to the second battery 30. The second battery 30 may receive the electrical energy from the power management device 100 and store the received electrical energy. When the power consumed by the second electrical load 33 is greater than the power delivered by the power management device 100, the second battery 30 may supply power to the second electrical load 33.

In addition, the second battery 30 may receive electric energy produced by the solar cell 40 through the power management device 100. The second battery 30 may be charged by power generated by the solar cell 40.

The second battery sensor 31 may detect the output (output voltage, output current, and the like) of the second battery 30. The second battery sensor 31 may generate battery data based on the output voltage of the second battery 30, the output current of the second battery 30, and the temperature of the second battery 30. The second battery sensor 31 provides second battery data including the SoC of the second battery 30, the SoH of the second battery 30, and the like to the power management device 100.

The second electrical load 33 may be a device that provides convenience to the driver of the vehicle 1 by consuming power supplied from the second battery 30 or the power management device 100. The second electrical load 33 may include, for example, an audio device, a HVAC device, a navigation device, a power seat, a seat heater, a headlight, and the like.

The power management device 100 may monitor a power state of the vehicle 1 based on the first battery data and the second battery data. The power management device 100 may control power generation of the generator 12 and power transfer between the first battery 20 and the second battery 30 based on the power state of the vehicle 1. For example, the power management device 100 may control the power generation operation of the generator 12 such that the SoC of the first battery 20 is maintained at a certain level or higher. The power management device 100 may also control the power transfer between the first battery 20 and the second battery 30 such that the SoC of the second battery 30 is maintained at a certain level or higher.

For example, the power management device 100 receives the first battery data from the first battery sensor 21 through the vehicle communication network NT. The power management device 100 transmits a power generation control message for controlling the generation power of the generator 12 to the generator 12 through the vehicle communication network NT. The generator 12 may adjust the generation power in response to the power generation control message.

In addition, the power management device 100 may receive the second battery data from the second battery sensor 31 through the vehicle communication network NT. Based on the second battery data, the power management device 100 may control power transfer between the first battery 20 and the second battery 30.

In addition, the power management device 100 may control transmission of electric energy from the solar cell 40 to the first battery 20 or to the second battery 30. In other words, the power management device 100 may allow the first battery 20 or the second battery 30 to be charged using the power generated by the solar cell 40.

When the output voltage of the first battery 20 and the output voltage of the second battery 30 are different from each other, the power management device 100 may include a DC-DC converter to allow or cut off power transfer and convert the voltage. For example, when the first battery 20 is a low voltage battery of 60 V or less, not a 12 V, or is a high voltage battery of 400 V, and the second battery 30 is a low voltage battery of 12 V, the power management device 100 may convert the power generated by the solar energy 40 into a high voltage of the first battery 20 or a low voltage of the second battery 30.

When the output voltage of the first battery 20 and the output voltage of the second battery 30 are approximately the same, the power management device 100 may include a power switch for allowing or blocking power transfer. For example, when both the first battery 20 and the second battery 30 are batteries of approximately 12 V voltage, the power management device 100 may transmit the power generated by the solar cell 40 to the first battery 20 or transmit the power generated by the solar cell 40 to the second battery 30.

The power management device 100 may include a power divider 150, a power supply 140, a communicator 130, a storage 120, and a controller 110.

The power divider 150 may distribute power generated by the generator 12 and/or the solar cell 40 between the first battery 20, the first electrical load 23, the second battery 30, and the second electrical load 33.

The generator 12 may be electrically connected to the first battery 20 and may be selectively connected to the second battery 30 through the power divider 150. In addition, the solar cell 40 may be selectively connected to the first battery 20 or the second battery 30 through the power divider 150.

The power divider 150 may allow the generator 12 to be electrically connected or disconnected to or from the second battery 30 under the control of the controller 110. In addition, the power divider 150 may allow the solar cell 40 to be electrically connected or disconnected to or from the first battery 20 under the control of the controller 110. The power divider 150 may also allow the solar cell 40 to be electrically connected or disconnected to or from the second battery 30.

The power divider 150 includes a first switch that allows or blocks electrical connection between the generator 12/the first battery 20 and the solar cell 40 and a second switch that allows or blocks electrical connection between the second battery 30 and the solar cell 40.

The power supply 140 may supply power to the power conversion device 50 under the control of the controller 110. For example, the power supply 140 may supply power from the first battery 20 or the second battery 30 to the power conversion device 50 or cut off the power supply to the power conversion device 50.

The communicator 130 may include a CAN transceiver that receives a communication signal from other electrical devices of the vehicle 1 and transmits a communication signal to other electrical devices of the vehicle 1 through the vehicle communication network NT. The communicator 130 may also include a communication controller for controlling the operation of the CAN transceiver.

The CAN transceiver may receive the first battery data and the second battery data from the first battery sensor 21 and the second battery sensor 31 through the vehicle communication network NT. The CAN transceiver may provide the first battery data and the second battery data to the controller 110. In addition, the CAN transceiver may receive a power generation control message from the controller 110 and transmit the power generation control message to the generator 12 through the vehicle communication network NT. The CAN transceiver may also receive a transmission control message from the controller 110 and transmit the received transmission control message to the power management device 100 through a vehicle communication network NT.

As such, the power management device 100 may communicate with electrical devices, such as the engine management system 10, the first battery sensor 21, and the second battery sensor 31, through the communicator 130.

The storage 120 may include a storage medium for storing control data for controlling the power management device 100 and a storage controller for controlling storage/deletion/loading of data stored in the storage medium.

The storage medium may include a semiconductor device drive (solid state drive, SSD), a magnetic disk drive (Hard Disc Drive, HDD), and the like, and may store various pieces of data for managing the SoC of the first battery 20 and the second battery 30.

The storage controller may store data in the storage medium in response to a storage signal from the controller 110. The storage controller may output the data stored in the storage medium to the controller 110 in response to a loading signal of the controller 110.

The storage 120 may store the driving state of the vehicle 1, information related to the first battery 20, information related to the second battery 30, and information related to the solar cell 40. For example, the storage 120 may store a table illustrated in FIG. 2.

The storage 120 may store the driving state of the vehicle 1. The driving state of the vehicle 1 may include, for example, travelling, stopping, and parking. The driving state of the vehicle 1 may be identified based on the starting state of the engine 11 and information received through the communicator 130.

The storage 120 may store a target SoC of the first battery 20. The target SoC is a value set to improve fuel efficiency and indicates a target value for charging of the first battery 20. The target SoC of the first battery 20 may be, for example, 65% to 95%. The target SoC may be set in advance by the designer of the vehicle 1 or may be set dynamically during travelling of the vehicle 1.

The storage 120 may store information of whether the first battery 20 has been mounted. Whether or not the first battery 20 has been mounted may be identified based on the output of the first battery sensor 21.

The storage 120 may store information of whether the first battery 20 is chargeable. Whether the first battery 20 is chargeable or not is identified based on the output of the first battery sensor 21 that is associated with full charging, high temperature, or non-mounting of the first battery 20.

The storage 120 may store the type and capacity of the first battery 20. The battery is classified as a lead acid battery, a lithium ion battery, and the like, and the capacity of the first battery 20 may indicate the amount of electrical energy that can be stored in the first battery 20.

The storage 120 may store the SoC of the first battery 20. As described above, the SoC may indicate the level to which the first battery 20 is charged between the full discharge state (0%) and the full charge state (100%).

The storage 120 may store information of whether the second battery 30 has been mounted, information of whether the second battery 30 is chargeable, the type/capacity of the second battery 30, and the SoC of the second battery 30.

The storage 120 may store a power supply limitation time of the power conversion device 50 with regard to solar power generation. When the solar cell 40 is shaded, the power management device 100 may temporarily supply power to the power conversion device 50. When the vehicle 1 passes through an underground road for a short time, the power conversion device 50 may be reset by interruption of power supply due to the shadow of the solar cell 40. In order to prevent such a constraint, the power management device 100 may temporarily supply power to the power conversion deice 50. On the other hand, when the vehicle 1 enters an underground parking lot, power generation of the solar cell 40 may be stopped for a long time. In this case, power supply to the power conversion device 50 may be stopped for efficient energy utilization. The power supply limitation time represents a limited length of time for which the power management device 100 temporarily supplies power to the power conversion device 50.

The storage 120 may store a power supply maintenance time of the power conversion device 50 with regard to solar power generation. The power supply maintenance time represents a time for which the power management device 100 has temporarily supplied power to the power conversion device 50. When the power supply maintenance time is greater than the power supply limitation time, the power management device 100 may stop supplying power to the power conversion device 50.

The storage 120 may store the amount of power generated by the solar cell 40 per hour. The amount of power generated per hour represents the amount of power produced by the solar cell 40 per unit time. When the amount of power generated by the solar cell 40 per hour is less than the power required for charging the batteries 20 and 30 (for example, power consumption of the power conversion device), the power management device 100 may not perform charging on the batteries 20 and 30 by the solar cell 40.

As such, the storage 120 may store the driving state of the vehicle 1, information related to the first battery 20, information related to the second battery 30, and information related to the solar cell 40.

The controller 110 may include a memory for storing a control program and/or control data for controlling the power management device 100 and a processor for generating a control signal according to the control program and control data stored in the memory.

The memory may provide programs and/or data to the processor according to a memory control signal of the processor. For example, the memory may temporarily store communication data received through the communicator 130 and/or data stored in the storage 120.

The memory includes volatile memories, such as a static random access memory (S-RAM), a dynamic random access memory (D-RAM), and non-volatile memories, such as a read-only memory (ROM), an erasable programmable read-only memory (EPROM), an Electrically Erasable Programmable Read Only Memory (EEPROM), and the like.

The processor may process data according to a program provided from the memory and generate a control signal according to the processing result. For example, the processor may process communication data received through the communicator 130 and/or data stored in the storage 120. The processor may output a power generation control signal for controlling the power generation operation of the generator 12.

The processor may include various logic circuits and operation circuits. The processor and the memory may be integrally implemented as a single chip or may be implemented as separate chips.

The controller 110 may control the power generation operation of the generator 12 based on the first battery data of the first battery 20. The controller 110 may control the power transfer operation of the power divider 150 based on the second battery data of the second battery 30.

The controller 110 may identify the driving state of the vehicle 1 based on the starting state of the engine 11 and information received through the communicator 130. The controller 110 may identify travelling, stopping, and parking of the vehicle 1, for example.

The controller 110 may acquire the amount of power generated by the solar cell 40 and determine whether the amount of power generated by the solar cell 40 is equal to or greater than a minimum amount of power for charging the batteries 20 and 30. When the amount of power generated by the solar cell 40 is equal to or greater than the minimum amount of power for charging the batteries 20 and 30, the controller 110 may control the power divider 150 to charge the first battery 20 or the second battery 30 using the solar cell 40.

The controller 110, when the amount of power generated by the solar cell 40 decreases due to the vehicle 1 passing through a shaded area, may control the power supply 140 to supply power to the power conversion device 50.

The controller 110 may select one of the batteries 20 and 30 to be charged using the solar cell 40 based on the charge-ability of the first battery 20, the SoC of the first battery 20, the charge-ability of the second battery 30, and the SoC of the second battery 30. In addition, the controller 110 may control the power divider 150 to charge the selected one of the batteries 20 and 30 using the solar cell 40.

Hereinafter, an operation of managing power of the vehicle 1 by the power management device 100 is described in more detail.

Figure 3:
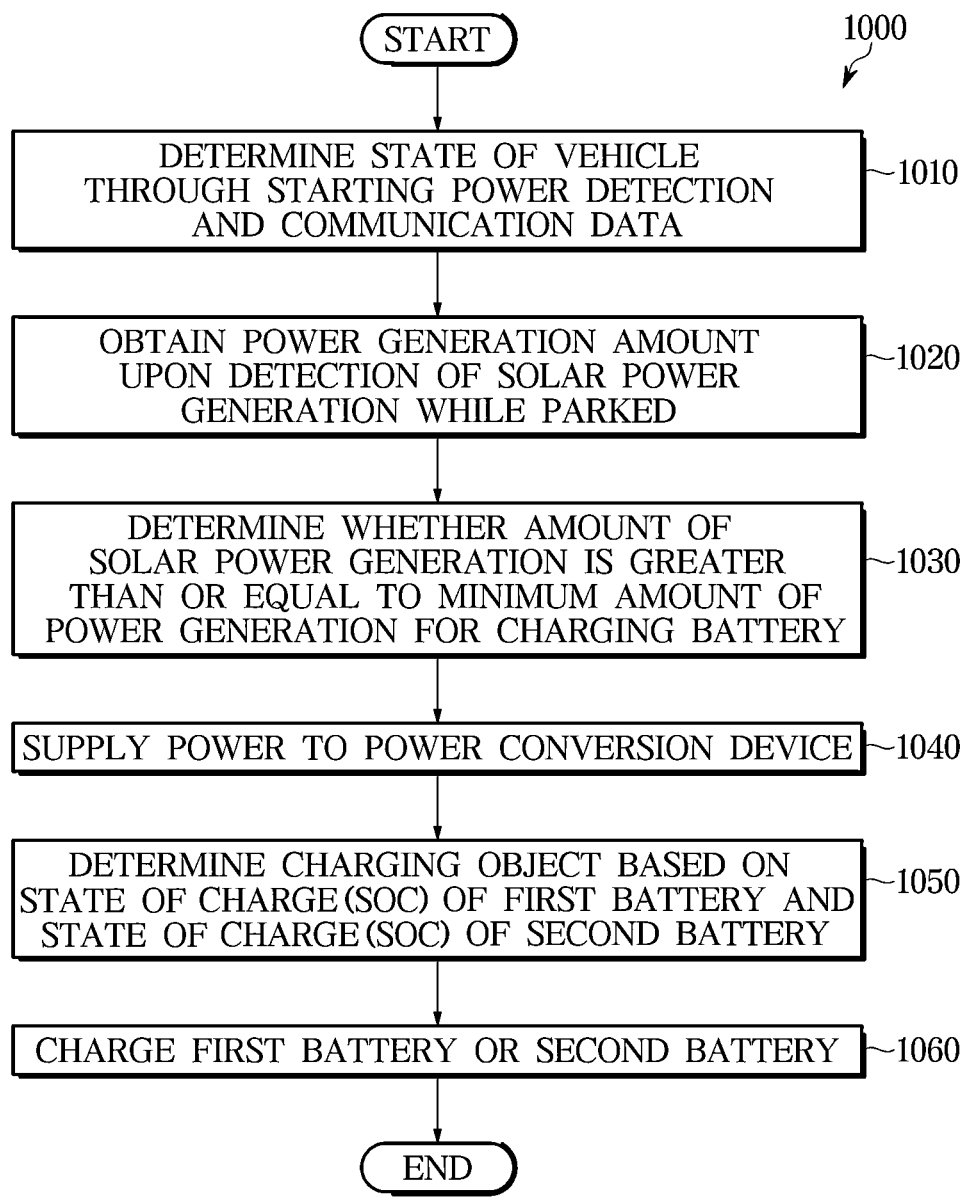
FIG. 3 illustrates a power management operation of a vehicle according to an embodiment.

FIG. 3 illustrates a power management operation of a vehicle according to an embodiment.

A power management operation (1000) of the vehicle 1 is described with reference to FIG. 3.

The vehicle 1 determines a driving state (1010).

The power management device 100 may identify the driving state of the vehicle 1 based on the starting state of the engine 11 and information received through the communicator 130. In addition, the power management device 100 may identify the driving state of the vehicle 1 based on data of an item "driving state" in the table stored in the storage 120. The driving state of the vehicle 1 may include, for example, travelling, stopping, and parking.

The vehicle 1 determines the amount of solar power generation (1020).

The power management device 100 may determine whether solar power generation is performed by the solar cell 40 during parking of the vehicle 1. When it is determined that the solar power generation is performed, the power management device 100 may receive information about the amount of power generated by the solar cell 40 from the power conversion device 50 and determine the amount of power generated by the solar cell 40. In addition, the power management device 100 may determine power generation during travelling of the vehicle 1 based on data of an item "hourly-power generation amount" in the table stored in the storage 120.

The vehicle 1 determines whether the amount of solar power generation is greater than or equal to a minimum amount of power generation (1030).

The power management device 100 may determine whether the amount of power generated by the solar cell 40 is greater than or equal to a minimum amount of power generation for charging the batteries 20 and 30. When the amount of power generated by the solar cell 40 is less than the minimum amount of power generation, the power management device 100 may not charge the batteries 20 and 30 using the solar cell 40 for the efficient use of energy.

When the amount of solar power generation is greater than or equal to the minimum amount of power generation, the vehicle 1 supplies power to the power conversion device 50 (1040).

The power conversion device 50 may receive power from the solar cell 40, but when the amount of power generation of the solar cell 40 is reduced even for a short time (for example, when the vehicle passes through a shaded area), the power conversion device 50 may be stopped and may be reset. In order to prevent such a limitation, the power management device 100 may supply power to the power conversion device 50 from the first battery 20 or the second battery 30 in a subsidiary manner.

The vehicle 1 selects one of the first battery 20 and the second battery 30 to be charged using the solar cell 40 (1050).

The power management device 100 may select one of the first battery 20 and the second battery 30 to be charged using the solar cell 40 based on the charge-ability of the first battery 20, the SoC of the first battery 20, the charge-ability of the second battery 30, and the SoC of the second battery 30.

The power management device 100 may determine the charge-ability of the first battery 20, the SoC of the first battery 20, the charge-ability of the second battery 30, and the SoC of the second battery 30 based on the first battery data and the second battery data received from the first battery sensor 21 and the second battery sensor 31, respectively. In addition, the power management device 100 may determine the charge-availabilities and the SoCs of the first and second batteries 20 and 30 based on data of items "charge-ability" and "SoC" of the first battery 20 and items "charge-ability" and "SoC" of the second battery 30 in the table stored in the storage 120.

For example, the power management device 100 may select a battery to be charged using the solar cell 40 based on the charge-ability of the first battery 20 and the charge-ability of the second battery 30. When both the first battery 20 and the second battery 30 are chargeable, the power management device 100 may select one of the first and second batteries 20 and 30 to be charged using the solar cell 40 based on the SoC of the first battery 20 and the SoC of the second battery 30.

The vehicle 1 charges the selected one of the batteries 20 and 30 using the solar cell 40 (1060).

The power management device 100 may electrically connect the solar cell 40 to the selected one of the batteries 20 and 30. For example, the power management device 100 may control the power divider 150 to transmit power from the power conversion device 50 connected to the solar cell 40 to the first battery 20 or control the power divider 150 to transmit power from the power conversion device 50 to the second battery 30.

Figure 4:
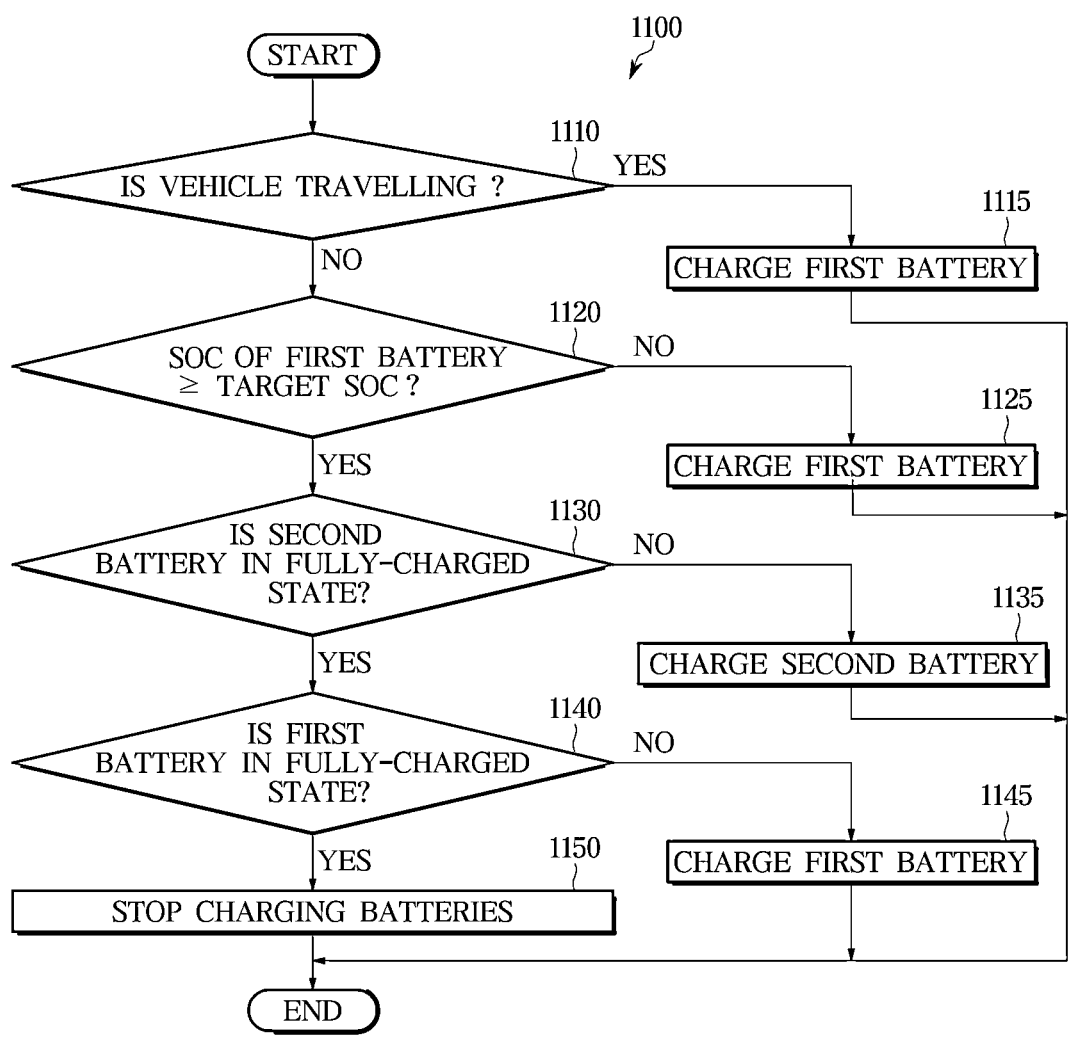
FIG. 4 illustrates a battery charging operation of a vehicle according to an embodiment.
Figure 5:
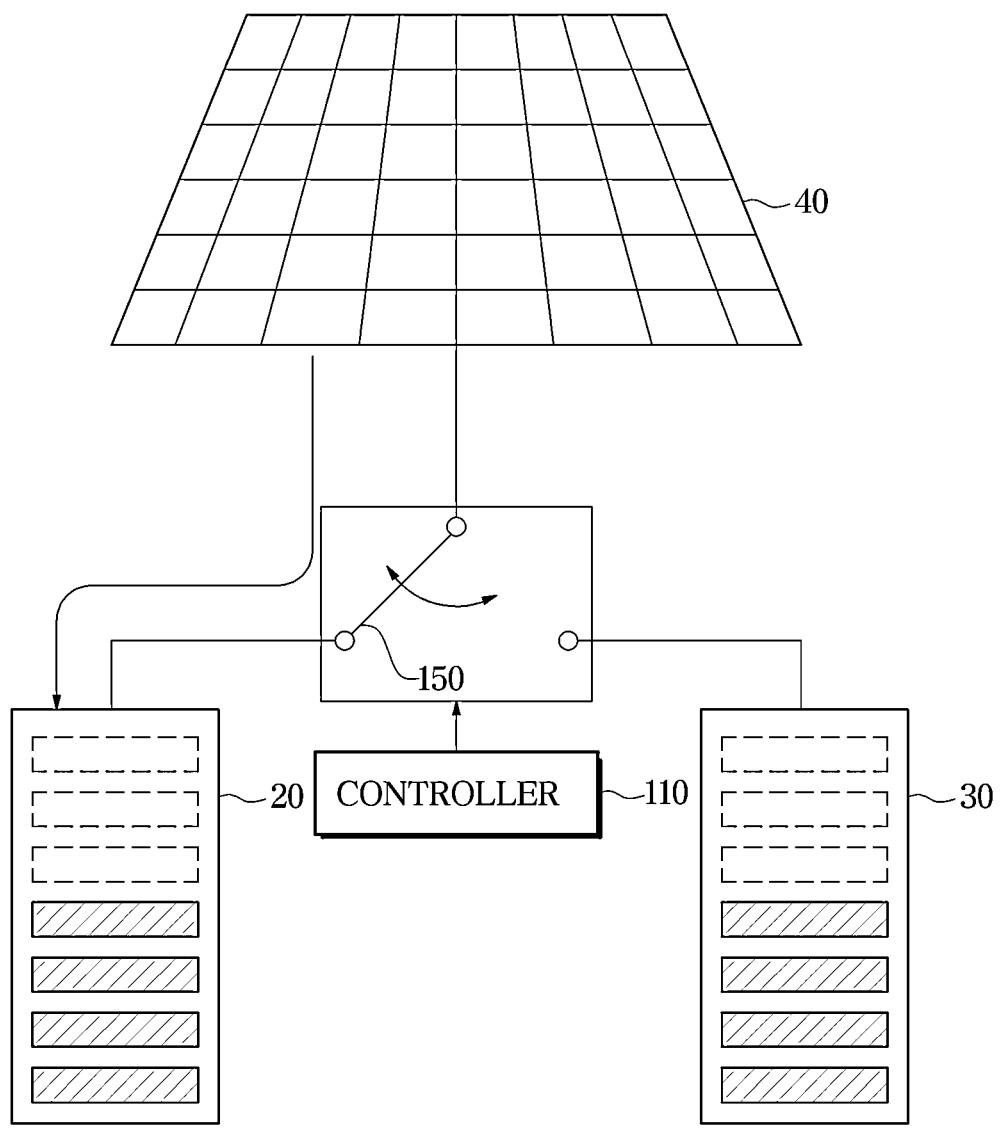
FIG. 5 illustrates an example of charging a first battery of a vehicle according to an embodiment.
Figure 6:
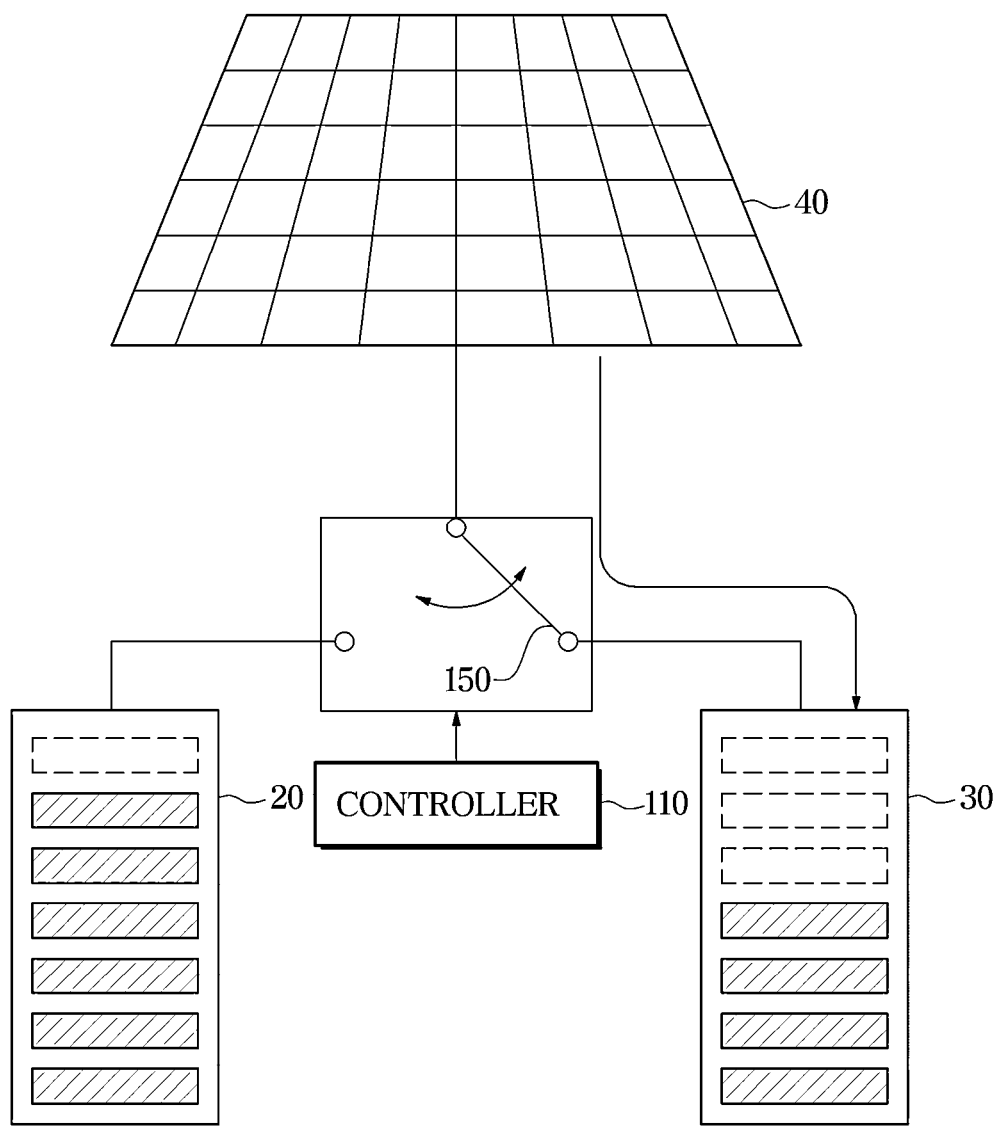
FIG. 6 illustrates an example of charging a second battery of a vehicle according to an embodiment.

FIG. 4 illustrates a battery charging operation of a vehicle 1 according to an embodiment. FIG. 5 illustrates an example of charging the first battery 20 of the vehicle 1 according to an embodiment. FIG. 6 illustrates an example of charging the second battery 30 of the vehicle 1 according to an embodiment.

A battery charging operation (1100) of the vehicle 1 is described with reference to FIGS. 4-6.

The vehicle 1 determines whether the vehicle 1 is travelling (1110).

The power management device 100 may identify the driving state of the vehicle 1 based on the starting state of the engine 11 and information received through the communicator 130. The power management device 100 may also determine whether the vehicle 1 is travelling. In addition, the power management device 100 may identify the driving state of the vehicle 1 based on data of item "driving state" in the table stored in the storage 120.

When the vehicle 1 is travelling (YES in operation 1110), the vehicle 1 charges the first battery 20 through the solar cell 40 (1115).

As described above, the main electrical devices related to travelling of the vehicle 1 and consuming a lot of power, such as an engine management system (EMS), a transmission controller (TCU), an electronic brake control module (EBCM), and an electric steering system (MDPS), are connected to the generator 12 and the first battery 20. Accordingly, the first battery 20 may be discharged and the generator 12 may operate. Thus, the fuel efficiency of the vehicle 1 may be lowered.

The power management device 100 may supply power generated by the solar cell 40 to the first battery 20 and the first electrical load 23 to prevent the fuel efficiency from being lowered during travelling. The power management device 100 may control the power divider 150 such that the power conversion device 50 connected to the solar cell 40 is connected to the first battery 20.

As the power conversion device 50 is connected to the first battery 20, the first battery 20 may be charged by the solar cell 40 as illustrated in FIG. 5.

When the vehicle 1 is not travelling (NO in operation 1110), the vehicle 1 determines whether a SoC of the first battery 20 is greater than or equal to a target SoC (1120).

When the vehicle 1 is not travelling, the vehicle 1 may be determined as being stopped or parked.

When the vehicle 1 is stopped or parked, the generator 12 does not produce power, and part of the first electrical load 23 may still consume power from the first battery 20. Accordingly, the power management device 100 may manage the SoC of the first battery 20 to be kept greater than or equal to a target SoC for starting the vehicle 1.

The power management device 100 may obtain the SoC of the first battery 20 from the first battery sensor 21 or may determine the SoC of the first battery 20 based on data of item "SoC" of the first battery in the table stored in the storage 120.

When the SoC of the first battery 20 is not greater than or equal to the target SoC (NO in operation 1120), the vehicle 1 charges the first battery 20 using the solar cell 40 (1125).

The first battery 20 is used to start the vehicle 1, and when the SoC of the first battery 20 is less than the target SoC, the vehicle 1 may not be started. Accordingly, the power management device 100 may charge the first battery 20 using the solar cell 40 while the vehicle 1 is travelling. The power management device 100 may control the power divider 150 such that the power conversion device 50 connected to the solar cell 40 is connected to the first battery 20.

As the power conversion device 50 is connected to the first battery 20, the first battery 20 may be charged by the solar cell 40 as illustrated in FIG. 5.

When the SoC of the first battery 20 is greater than or equal to the target SoC (YES in operation 1120), the vehicle 1 determines whether the second battery 30 is in a fully charged state (1130).

When the SoC of the first battery 20 is greater than or equal to the target SoC, the power management device 100 determines whether the second battery 30 is in a fully charged state to determine whether to charge the second battery 30.

The power management device 100 may determine whether the second battery 30 is in a fully charged state based on the second battery data received from the second battery sensor 31 or based on data of items "charge-ability" and "charge rate" of the second battery 30 in the table stored in the storage 120.

When the second battery 30 is not in a fully charged state (NO in operation 1130), the vehicle 1 charges the second battery 30 using the solar cell 40 (1135).

When the SoC of the first battery 20 is greater than or equal to the target SoC and the second battery 30 is chargeable, the power management device 100 may charge the second battery 30 using the solar cell 40. The power management device 100 may control the power divider 150 such that the power conversion device 50 connected to the solar cell 40 is connected to the second battery 30.

As the power conversion device 50 is connected to the second battery 30, the second battery 30 may be charged by the solar cell 40 as illustrated in FIG. 6.

When the second battery 30 is in a fully charged state (YES in operation 1130), the vehicle 1 determines whether the first battery 20 is in a fully charged state (1140).

When the second battery 30 is not chargeable, the power management device 100 may determine whether the first battery 20 is in a fully charged state to determine whether to charge the first battery 20.

The power management device 100 may determine whether the first battery 20 is in a fully charged state based on the first battery data received from the first battery sensor 21 or based on data of items of "charge-ability" and "charge rate" of the first battery 20 in the table stored in the storage 120.

When the first battery 20 is not in a fully charged state (NO in operation 1140), the vehicle 1 charges the first battery 20 using the solar cell 40 (1145).

When the second battery 30 is not chargeable and the first battery 20 is chargeable, the power management device 100 may charge the first battery 20 using the solar cell 40. The power management device 100 may control the power divider 150 such that the power conversion device 50 connected to the solar cell 40 is connected to the first battery 20.

As the power conversion device 50 is connected to the first battery 20, the first battery 20 may be charged by the solar cell 40 as illustrated in FIG. 5.

When the first battery 20 is in a fully charged state (YES in operation 1140), the vehicle 1 does not perform charging on the batteries 20 and 30 using the solar cell 40 (1150).

When both the first battery 20 and the second battery 30 are in a fully charged state, the power management device 100 does not charge the batteries 20 and 30 using the solar cell 40 to prevent over-charge of the batteries 20 and 30. The power management device 100 may control the power divider 150 such that the power conversion device 50 is disconnected from both the first battery 20 and the second battery 30. In addition, the power management device 100 may control the power supply 140 to stop supplying power to the power conversion device 50.

As is apparent from the above, a vehicle capable of improving the energy harvesting efficiency by a solar cell can be provided.

Embodiments of the present disclosure have been described above. In the embodiments described above, some components may be implemented as a "module". The term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While embodiments have been described with respect to a limited number of embodiments, those having ordinary skill in the art, having the benefit of this disclosure, will appreciate that other embodiments can be devised which do not depart from the scope as disclosed herein. Accordingly, the scope should be limited only by the attached claims.

Although embodiments of the present disclosure have been described for illustrative purposes, those having ordinary skill in the art will appreciate that various modifications, additions and substitutions are possible, without departing from the scope and spirit of the disclosure. Therefore, embodiments of the present disclosure have not been described for limiting purposes.

What is claimed is:

1. A method of controlling a vehicle including a first battery, a second battery, a solar cell, a power converter, a power divider, and a power supply, the method comprising:
producing, by the solar cell, power;
converting, by the power converter, a voltage of the produced power;
transferring, by the power divider, the power produced by the solar cell to at least one of the first battery or the second battery based on a state of charge (SoC) of the first battery and a SoC of the second battery; and
stopping the power supply from supplying power to the power converter when a time for which the power is supplied to the power converter is longer than or equal to a predetermined reference time,
wherein transferring, by the power divider, the power produced by the solar cell to at least one of the first battery or the second battery includes
determining whether a SoC of the first battery is greater than or equal to a target SoC,
determining whether the second battery is in a fully charged state, and
transferring the power produced by the solar cell to the second battery when the vehicle is parked, when the first battery has a SoC greater than or equal to a target SoC, and when the second battery is chargeable.

2. The method of claim 1, further comprising supplying power to the power converter when an amount of the power produced by the solar cell is greater than or equal to a reference value.

3. The method of claim 1, further comprising supplying power to the power converter when the vehicle passes through a shaded area.

4. The method of claim 1, further comprising transferring the power produced by the solar cell to the first battery when the vehicle is travelling.

5. The method of claim 1, further comprising transferring the power produced by the solar cell to the first battery when the vehicle is parked and when the first battery has a SoC less than a target SoC.

6. The method of claim 1, further comprising transferring the power produced by the solar cell to the first battery when the vehicle is parked, when the first battery has a SoC greater than or equal to a target SoC, and when the second battery is fully charged.

7. The method of claim 1, further comprising interrupting connection between the solar cell and the first and second batteries when the vehicle is parked, when the first battery is fully charged, and when the second battery is fully charged.

* * * * *